US010282523B2

(12) United States Patent
Kopren

(10) Patent No.: US 10,282,523 B2
(45) Date of Patent: *May 7, 2019

(54) LICENSE MANAGEMENT SOLUTION FOR CENTRAL-MANAGEMENT PRODUCTS

(71) Applicant: Hewlett-Packard Enterprise Development LP, Houston, TX (US)

(72) Inventor: Toran K. Kopren, Fort Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1192 days.

This patent is subject to a terminal disclaimer.

(21) Appl. No.: 14/519,670

(22) Filed: Oct. 21, 2014

(65) Prior Publication Data
US 2015/0039378 A1    Feb. 5, 2015

Related U.S. Application Data

(62) Division of application No. 12/362,723, filed on Jan. 30, 2009, now Pat. No. 8,898,085.

(51) Int. Cl.
| | | |
|---|---|---|
| *G06F 21/10* | (2013.01) | |
| *G06F 21/00* | (2013.01) | |
| *G06Q 10/06* | (2012.01) | |
| *H04L 29/06* | (2006.01) | |

(52) U.S. Cl.
CPC ............ *G06F 21/105* (2013.01); *G06F 21/00* (2013.01); *G06Q 10/06315* (2013.01); *H04L 67/42* (2013.01)

(58) Field of Classification Search
USPC .......................................... 705/59
See application file for complete search history.

(56) References Cited

U.S. PATENT DOCUMENTS

| | | | |
|---|---|---|---|
| 5,138,712 A | 8/1992 | Corbin | |
| 5,742,757 A | 4/1998 | Hamadani et al. | |
| 6,810,389 B1 | 10/2004 | Meyer | |
| 7,013,294 B1 | 3/2006 | Sekigawa et al. | |
| 7,536,599 B2 * | 5/2009 | Paliwal ............... | G06F 11/2247 714/15 |
| 8,898,085 B1 * | 11/2014 | Kopren .................. | G06F 21/00 705/59 |
| 2002/0112171 A1 | 8/2002 | Ginter et al. | |
| 2005/0086174 A1 | 4/2005 | Eng | |
| 2005/0182731 A1 | 8/2005 | Marjadi et al. | |
| 2006/0212332 A1 | 9/2006 | Jackson | |
| 2006/0224522 A1 | 10/2006 | Wald | |
| 2006/0248017 A1 | 11/2006 | Koka et al. | |
| 2006/0259796 A1 | 11/2006 | Fung | |
| 2007/0005505 A1 | 1/2007 | D'Alo et al. | |
| 2007/0016531 A1 | 1/2007 | Boomershine et al. | |
| 2007/0118481 A1 | 5/2007 | Bostrom et al. | |
| 2007/0130079 A1 | 6/2007 | Ivanov et al. | |

(Continued)

*Primary Examiner* — Tsan-Yu J Huang
(74) *Attorney, Agent, or Firm* — Clifton L. Anderson

(57) ABSTRACT

A license manager running on a central-management server receives a license request for licensing a managed node as a client of a central-management product running on a central-management server. The license manager proposes a solution involving applying respective licenses for plural distinct central-management products. In response to a unified command, implementing said solution.

11 Claims, 2 Drawing Sheets

(56) References Cited

U.S. PATENT DOCUMENTS

| | | |
|---|---|---|
| 2007/0143759 A1 | 6/2007 | Ozgur et al. |
| 2007/0174205 A1 | 7/2007 | Saito |
| 2007/0198427 A1 | 8/2007 | Vajjiravel et al. |
| 2007/0265976 A1 | 11/2007 | Helfer et al. |
| 2008/0098216 A1 | 4/2008 | Scovetta |
| 2008/0133418 A1 | 6/2008 | Lehmann et al. |
| 2008/0183626 A1 | 7/2008 | Romero et al. |
| 2008/0235141 A1 | 9/2008 | Hilerio et al. |

\* cited by examiner

LICENSE MANAGEMENT SOLUTION FOR CENTRAL-MANAGEMENT PRODUCTS

This is a divisional of allowed copending U.S. patent application Ser. No. 12/362,723 filed 2009 Jan. 30.

BACKGROUND

Data centers and other large computer systems can have many computing resources of many different types such as stand-alone computers, blade systems, rack systems, partition-able complexes, and virtual machines. Central management can assist an administrator in managing such complex systems. However, different data centers have need for different management features; also different computing resources within a data center may have different needs for management features. Accordingly, a variety of management software products may be available "a la carte"; furthermore, an administrator is often able to choose which nodes are to receive the benefit of a particular management product and to what extent.

BRIEF DESCRIPTION OF THE DRAWINGS

The figures depict implementations/embodiments of the invention and not the invention itself.

DETAILED DESCRIPTION

Figure 1:
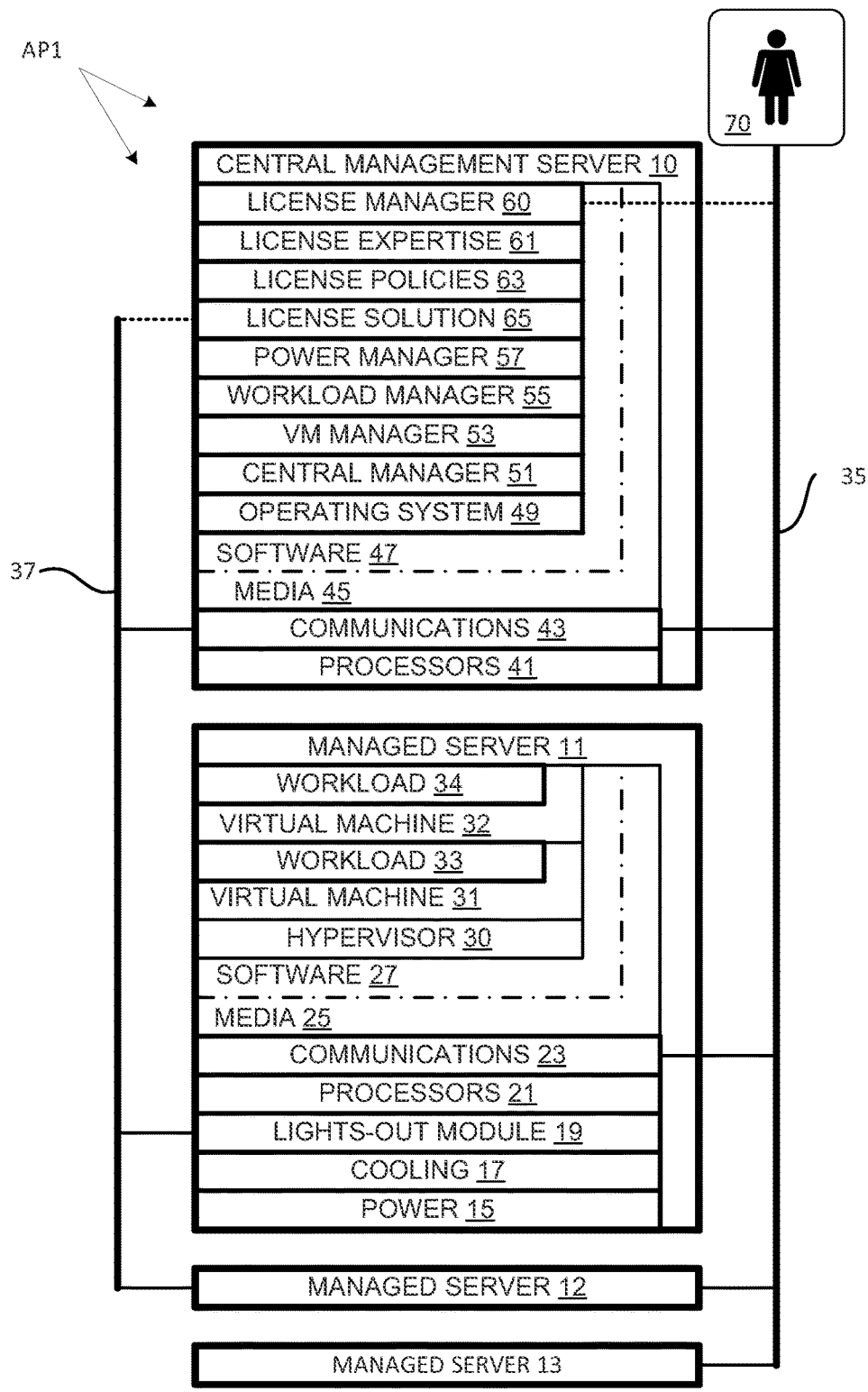
FIG. 1 is a schematic diagram of a data center in accordance with an embodiment of the invention.

The present invention provides for easing the burden of a computer administrator in managing the inter-dependencies among central-management products and their license policies. For example, if an administrator wishes to apply a license for central-management product A to a managed node, but product B is a pre-requisite, an embodiment of the present invention can propose a solution involving applying licenses for products A and B and, then, in response to an acceptance of the solution, apply the necessary licenses to the managed node. In this way, the administrator's intent can be ascertained and carried out using knowledge of sometimes complex and diverse policies. More complex examples are presented below.

In accordance with an embodiment of the invention, a data center AP1 includes a central-management server 10 for managing managed nodes including managed servers 11, 12, and 13. Managed server 11 includes computing resources such as a power supply 15, cooling devices 17, a lights-out module 19, processors 21, communications devices 23, and computer-readable storage media 25.

Media 25 is encoded with software 27 including data and programs of computer-executable instructions. Software 27 interacts with the hardware of managed server 11 to define the functionality thereof. Tangibly embodied software 27 includes a hypervisor 30 supporting virtual machines 31 and 32; virtual machines 31 and 32 run respective workloads 33 and 34. In addition to managed servers 11-13 themselves, virtual machines 31 and 32 and lights-out-module 19 are managed nodes in that they are recognized as management clients by at least one central-management product running on central-management server 10.

Central-management server 10 manages managed nodes 11-13, 19, 31, and -32 via an in-band network 35 and an out-of-band network 37. Network 35 is "in-band" in that it is used for data transfers between workloads located on different managed servers; network 37 is an "out-of-hand" network in that it is not normally used for transferring data among workloads, but is dedicated to a management function, in this case, managing power consumption via light-out modules, e.g., lights-out module 19.

Central-management server 10 includes processors 41, communications devices 43, and computer-readable storage media 45. Media 45 is encoded with software 47 tangibly embodied therein. Software 47 interacts with the hardware of central-management server 10 to define the functionality thereof. Software 47 includes data and programs of computer-executable instructions such as an operating system 49, a central manager 51, a virtual-machine manager 53, a workload manager 55, a power manager 57, a license manager 60, license expertise 61, license policies 63, and one or more license solutions 65. Note that some or all of software 27 and 47 can be provided in tangible form on a manufacture in the form of computer-readable media such as a hard disk.

Central manager 51 provides for basic central-management functionality for managed hardware servers 11-13. Virtual-machine manager 53 extends management functions to virtual machines and their hosts. Workload manager 55 is directed to allocating computing resources to workloads, e.g., based on expected demand. Power manager 57 is directed to managing power, recognizing lights-out modules, such as lights-out-module 19 as clients.

Some workloads vary considerably over time in the amount of computing resources they consume. Accordingly, power consumption can often be reduced when such workloads are inactive. To take advantage of possible energy savings, an administrator attempts to apply a license for power manager 57 to the node on which workload 33 runs, in this case, virtual machine 31. However, license policies 63 specify that power manager 57 only accepts lights-out modules as clients. Instead of refusing a request to apply power manager 57 to virtual machine 31 or returning some sort of error message, license manager 60 returns a solution 65.

License manager 60 generates a solution by interacting with license expertise 61, which includes an expert system and knowledge base directed to license dependencies. Expertise 61 specifies that workload manager 56 can only manage a virtual machine if the virtual-machine host (in this case, server 11) is licensed as a client for workload manager 56. In addition, workload manager 56 can only affect power consumption if a connected lights-out-module is licensed as a client of power manager 57. Expertise 61 can propose: licensing managed server 11 as a client for workload manager 55 and virtual machine manager 53, and licensing lights-out-module 19 as a client of power manager 57. This proposed solution 65, if implemented, would allow management of virtual machine 31 to control power consumption. This proposed solution 65 can be presented to administrator 70, e.g., via a console connected to central management server 10 via network 35.

Figure 2:
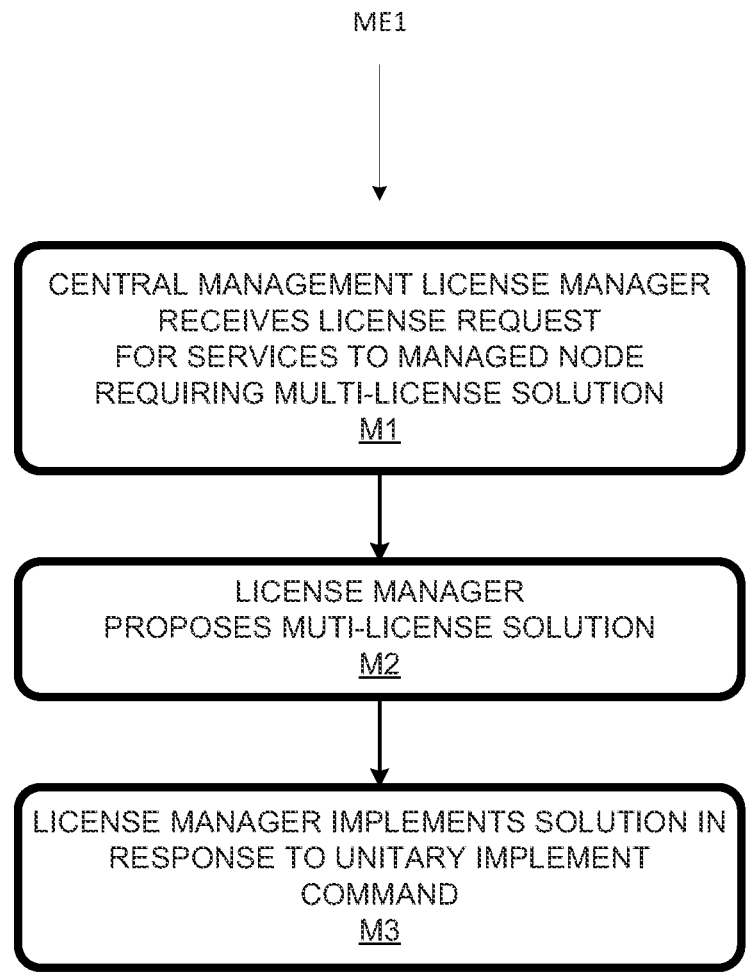
FIG. 2 is a flow chart of a method in accordance with an embodiment of the invention.

A method ME1 in accordance with an embodiment of the invention, flow-charted in FIG. 2, includes a method segment M1 of an administrator making and a license manager running on a central-management server receiving a license request. In this the request requires a multi-license solution. By "multi-license" is meant that distinct licenses for distinct central-management products are required. By "distinct" is meant that this condition is not net by two identical licenses that cover a pair of central-management products.

At method segment M2, the license manager generates and presents to an administrator a proposed multi-license solution. This can involve presenting a textual description of the solution on a display viewed by the administrator. This method segment involves performing any substeps required to arrive at the solution. For example, the substeps can involve accessing an expert system and knowledge base. In an alternative mode, the solution is implemented automatically without requiring an intervening acceptance by the administrator.

At method segment M3, if the proposal is accepted, the license manager implements the proposed solution. Acceptance can occur when the administrator indicates approval by interacting with the console on which the proposed solution was presented. If the interaction yields an implement command, the license manager can involve associating license keys with the proposed respective managed nodes in a local license database. The implementation command can be unified in that only one command is required for multiple licenses to be assigned. Herein, "unified" does not preclude issuing the command and then confirming the command.

The administrator would simply need to add all keys received from the vendor into the license manager, select a product (or solution level product (e.g. one that depends on others), select system(s), click on a control to begin license assignment, wait for a confirmation screen, and then click to make it so. This requires one administrative action for all products across the solution stack that has dependencies and varying policies. Method ME1 can also allow for the administrator to select multiple product licenses at once for assignment and then carry out the administrator's intent.

To make this work, a central-management product defines its license policy, while the license manager "understands" and interprets the various policies. Different products can require different licenses with different policies. For example, the different licenses may involve different compute units (e.g. per-core versus per-processor licensing) or, dependent products that need to be licensed, etc. Such definitions are accomplished with something like an extended markup language (xml) file format that could be registered with the license manager. The registration can occur when the product is installed or configured.

After target nodes are selected, the user is asked what products are to be licensed for the selected nodes. The user can then click a control to begin assignment. In response, the internal implementation examines the defined policies for the product license type and examine characteristics of the selected systems. This analysis focuses in determining all the licenses that need to be applied to make the "solution" operational, the correct number of licenses to apply, and the proper managed node type to apply all the licenses on. After analysis, the user is presented with a report that indicates what needs/should be done to get everything properly licensed and a button to make it so (or commit the report). The report provides details, such as the following:

1) another key type needs to be purchased, if not already purchased, and added resolve a dependent product;

2) the license manager cannot automatically apply the license or that a manual step (which is better than nothing) may be required;

3) other license types will also be applied to selected nodes to license the solution and dependencies;

4) licenses applied may be to varying node types and not just the nodes initially selected; and 5) the user may be invited to adjust the license parameter values before committing.

A vendor-specific (Hewlett-Packard Company) embodiment is described next. A data-center administrator wants to manage a given virtual machine (VM) with Hewlett-Packard Insight Dynamics-Virtual Server Environment (ID-VSE); it is assumed that the administrator has already entered all license keys received from Hewlett-Packard (HP). The administrator enters the license manager, selects the ID-VSE product or capability, and selects "assign licenses". The administrator selects the VM as the target, and then proceeds with assigning the license. Also, an administrator can select multiple products at once and the license manager determines what is needed for the two distinct selections (vs. a solution stack model). Alternatively, the administrator can select: the product to be licensed and then the license targets.

Internal analysis and results report the following: 1) ID-VSE is licensed per VM host and thus an ID-VSE license will be applied to the respective host system. 2) ID-VSE requires an insight Control Environment (ICE) license and one of those will also be applied to the VM HOST. 3) An iLO license is also required by HP-ID for advanced power capabilities within Insight Power Manager, which is licensed by the ICE license; the administrator would be instructed to ensure iLO has a key entered and this assignment will then attempt to collect the info from the VM host's iLO (not the VM) and apply to enable functionality on the central-management server (CMS). 4) The VM selected is within a VM host that is a c-class blade. A virtual connect enterprise manager (VCEM) license is required for blades. VCEM licensing is enclosure-based and thus a license will be applied to the blade enclosure. 5) The administrator then clicks on the confirm button and the reported analysis is applied and committed.

Herein, related art is described to facilitate understanding of the invention. Related art labeled "prior art" is admitted prior art; related art not labeled. "prior art" is not admitted prior art. Alternative embodiments provide for various types of license dependencies including prerequisites and feature-enabling licenses. These and other variations upon and modifications to the illustrated embodiments are provided by the present invention, the scope of which is defined by the following claims.

What is claimed is:

1. A license-management method comprising:
receiving, by a license manager running on a central-management server, a license request for licensing a first node as a client of a first central-management product, the first central-management product running on said central-management server, the request being received from a requestor, the first node being separate from the central-management server;
identifying, by the license manager, at least one prerequisite to licensing the first node as a client of the first central-management product, the prerequisite involving licensing the first node or a second node as a client of a second central-management product;
proposing, by the license manager, a solution involving licensing plural distinct central-management products, the solution including licensing the second central-management product to the first node or the second node; and
in response to acceptance of the solution by the requestor, implementing the solution.

2. The license-management method of claim 1 wherein the second central-management product is separate from the first central-management product or the first node is a virtual server executing on the second node, the second node being a physical server, the solution including licensing the first central-management product.

3. The license-management method of claim 1 wherein the first node is a virtual server, the second node is a physical server, the first central-management product is a workload manager and the second central-management product is the workload manager.

4. The license-management method of claim 1 wherein the second node is a lights-out module hosted by the first node or a physical server on which the first node executes.

5. The license-management method of claim 4 wherein the solution further includes licensing the first central-management product to the first node and to a third node, the first central-management product being a workload manager, the second central-management product being a power manager, the first node being a virtual server, the third node being a physical server hosting the first node, and the second node being a physical server hosting the first and third nodes.

6. A license-management system comprising non-transitory media encoded with code that, when executed by a processor, cause the processor to define a license manager and implement a process including:
   receiving, by the license manager running on a central-management server, a license request for licensing a first node as a client of a first central-management product, the first central-management product running on said central-management server, the request being received from a requestor, the first node being separate from the central-management server;
   identifying, by the license manager, at least one prerequisite to licensing the first node as a client of the first central-management product, the prerequisite involving licensing the first node or a second node as a client of a second central-management product;
   proposing, by the license manager, a solution involving licensing plural distinct central-management products, the solution including licensing the second central-management product to the first node or the second node; and
   in response to acceptance of the solution by the requestor, implementing the solution.

7. The license-management system of claim 6 wherein the second central-management product is separate from the first central-management product or the first node is a virtual server executing on the second node, the second node being a physical server, the solution including licensing the first central-management product.

8. The license-management system of claim 6 wherein the first node is a virtual server, the second node is a physical server, the first central-management product is a workload manager and the second central-management product is the workload manager.

9. The license-management system of claim 6 wherein the second node is a lights-out module hosted by the first node or a physical server on which the first node executes.

10. The license-management method of claim 9 wherein the solution further includes licensing the first central-management product to the first node and to a third node, the first central-management product being a workload manager, the second central-management product being a power manager, the first node being a virtual server, the third node being a physical server hosting the first node, and the second node being a physical server hosting the first and third nodes.

11. The license-management system of claim 6 further comprising said processor.

* * * * *